United States Patent [19]

Nishida

[11] Patent Number: 4,905,248
[45] Date of Patent: Feb. 27, 1990

[54] METAL VAPOR LASER APPARATUS

[75] Inventor: Naoto Nishida, Yokohama, Japan

[73] Assignee: Kabushiki Kaisha Toshiba, Kawasaki, Japan

[21] Appl. No.: 280,352

[22] Filed: Dec. 6, 1988

[30] Foreign Application Priority Data

Dec. 8, 1987 [JP] Japan .................. 62-308566

[51] Int. Cl.$^4$ .......................... H01S 3/22; H01S 3/03
[52] U.S. Cl. ..................... 372/56; 372/55; 372/61
[58] Field of Search .................. 372/56, 55, 61

[56]  References Cited

U.S. PATENT DOCUMENTS

| 3,576,500 | 4/1971 | Gould et al. | 372/56 |
| 4,247,830 | 1/1981 | Karras et al. | 372/56 |
| 4,255,720 | 3/1981 | Wang et al. | 372/56 |
| 4,287,484 | 9/1981 | Wang et al. | 372/56 |
| 4,380,078 | 4/1983 | Wang et al. | 372/62 |
| 4,442,523 | 4/1984 | Bricks | 372/56 |

FOREIGN PATENT DOCUMENTS

| 0009965 | 4/1980 | European Pat. Off. |  |
| 0116096 | 10/1978 | Japan | 372/61 |
| 0040093 | 3/1979 | Japan | 372/61 |
| 0159075 | 10/1982 | Japan | 372/61 |

OTHER PUBLICATIONS

Hernquist, "Noblest of Metal-Vapor Lasers", Laser Focus, Vol. 9, No. 9, Sep., 1973, pp. 39-40.
Schmidt et al., "Three Color Laser with Optimized Output Power", Applied Optics, Vol. 25, No. 9, May, 1986, pp. 1383-1388.
Burkward et al., "Quasi-CW Laser Action from HG-III Lines", Optics Communication, Vol. 18, Sep., 1976, pp. 485-487.

Primary Examiner—William L. Sikes
Assistant Examiner—Georgia Y. Epps
Attorney, Agent, or Firm—Cushman, Darby & Cushman

[57]  ABSTRACT

In a metal vapor laser apparatus of this invention, a cathode electrode side end portion is made longer along a tube axis than an anode electrode side end portion. A distance between a cathode side end of the discharge tube and a cathode electrode is longer along a tube axis direction than a distance between an anode side end of the discharge tube and an anode electrode.

5 Claims, 3 Drawing Sheets

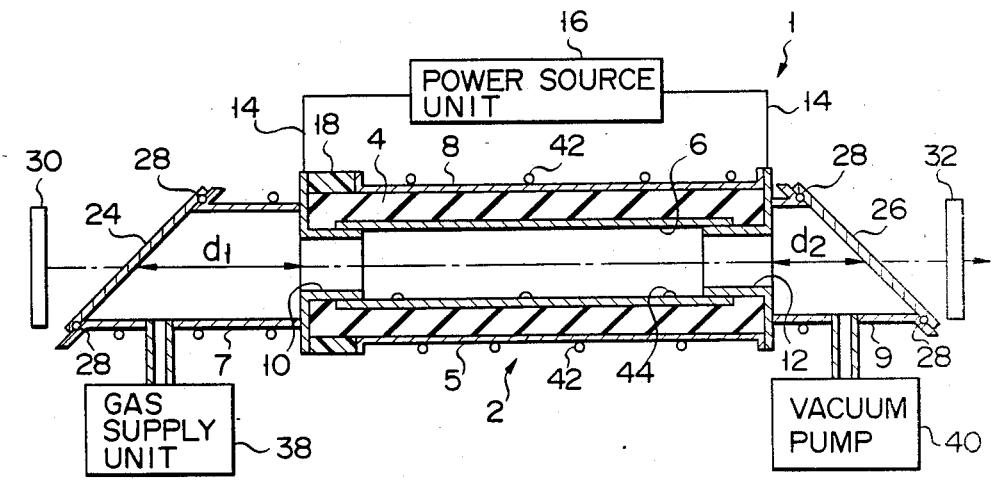
F I G. 2

METAL VAPOR LASER APPARATUS

BACKGROUND OF THE INVENTION

1. Field of the Invention

The present invention relates to a laser apparatus and, more particularly, to a metal vapor laser apparatus using, e.g., copper as a laser medium.

2. Description of the Related Art

A metal vapor laser has attracted attention as a light source used in uranium enrichment. In uranium enrichment, $^{235}_{92}U$ serving as a fuel for atomic fission nuclear electric power generation is separated from natural uranium and enriched. Since an abundance of $^{235}_{92}U$ is 0.071% in the natural uranium, $^{235}_{92}U$ must be enriched to be about 3% in order to be used as a nuclear fuel. For this purpose, in an uranium enrichment atom method using a laser beam, only $^{235}_{92}U$ is excited and ionized by a dye laser or the like and separated by an electrode applied with a voltage. In this case, the dye laser is a special laser in which in order to oscillate a dye laser beam, another type of laser beam is used. That is, in order to excite a laser medium of the dye laser, another type of laser beam is used. An example of the laser used for oscillating the dye laser beam is a metal vapor laser. An example of the metal vapor laser for dye laser excitation is a copper vapor laser.

FIG. 1 shows a conventional metal vapor laser apparatus. The apparatus has discharge tube 102, the interior of which is kept airtight. Tube 102 consists of central portion 103 and two end portions 105 and 107. Central portion 103 of tube 102 has heat insulating member 106. Cylindrical airtight vessel 104 is arranged outside member 106. Vessel 104 is concentrically arranged. Cylindrical core tube 108 is located inside member 106. A metal vapor source, e.g., a plurality of grains of copper materials 110 are located inside tube 108. Substantially annular cathode and anode electrodes 112 and 114 are located at both ends of tube 108 and member 106. Each of electrodes 112 and 114 has an L-shaped section along a plane including an optical axis. Electrodes 112 and 114 are connected to electric wires 116 extending from power source unit 118. In order to reliably insulate electrodes 112 and 114, annular high-voltage insulating member 120 is formed to be in contact with electrode 112 and vessel 104. Laser beam transmission windows 122 and 125 are arranged at end portions 105 and 107 of discharge tube 102, respectively. Sealing members 123 are arranged between window 122 and portion 105, and between window 125 and portion 107. Windows 122 and 125 are mounted at equal distances from electrodes 112 and 114, respectively. In this case, windows 122 and 125 are arranged to form a Brewster angle with respect to the optical axis. High reflecting mirror 124 is arranged next to one window to reflect a laser beam transmitted through window 122, and output mirror 126 is arranged next to the other window. Cooling pipe 128 is wound around the outer surface of tube 102. Gas supply unit 130 is located at end portion 105 of tube 102, and vacuum pump 132 is located at end portion 107 thereof.

The conventional metal vapor laser apparatus having the above arrangement oscillates a laser beam as follows. First, pump 132 is activated to evacuate tube 102 to obtain a negative pressure therein. A buffer gas, e.g., Ne gas is supplied at a pressure of about 10 to 20 Torr from gas supply unit 130 to tube 102. Then, electrical discharge is generated between electrodes 112 and 114 by, e.g., a pulse voltage applied from lower source unit 118. Copper materials 110 as a metal vapor source are heated by this discharge. Heated copper materials 110 are partially evaporated to be metal atoms and diffused in tube 102. In the above state, the buffer gas is ionized or excited by discharge. When the buffer gas collides against the metal atoms, energy is transferred to the metal atoms to excite them. The excited metal atoms transit to generate a laser beam. This laser beam is resonated and amplified between mirrors 124 and 126. As a result, a laser beam is emitted from mirror 126.

In the metal vapor laser apparatus which oscillates a laser beam as described above, core tube 108 is heated by electrical discharge between electrodes 112 and 114. The temperature of tube 108 is heated to a thousand and several hundred degrees. Metal atoms evaporated in this state are partially, positively charged by discharge. The positively charged metal atoms move toward cathode electrode 112. Sealing members 123 are used, however, in order to airtightly mount windows 122 and 125 on tube 102. In this case, a material of sealing members 123 must be kept at a temperature of 200° C. or less. For this reason, the metal vapor evaporated in high-temperature core tube 108 and moving toward cathode electrode 112 tends to collide against window 122 located along its moving direction. Since window 122 is at a relatively low temperature, a metal vapor or an impurity is adhered and solidified on window 122. In addition, a temperature distribution in the core tube is not uniform but a highest temperature portion is offset to the cathode side. For this reason, the density of the metal vapor is higher at the cathode side, and therefore the metal vapor or the like tends to be adhered on window 22. As a result, the transmission windows are contaminated by the metal vapor and their light transmittivity is reduced over time. If the transmittivity of the windows is reduced, an oscillation efficiency of a laser beam is reduced This oscillation efficiency reduction poses a problem of reduction in a service life of the metal vapor laser apparatus.

In order to solve the above problem, the two transmission windows arranged at the both ends of the discharge tube may be separated sufficiently from the corresponding electrodes. In this method, however, the overall length of the discharge tube is increased to undesirably enlarge the apparatus. In addition, when a pulse width of the pulse voltage to be applied to the electrodes is about 20 ns, the number of times of oscillation of the laser beam between the mirrors is reduced. Therefore, problems such as degradation in a short pulse laser beam quality or ASE (Amplified Spontaneous Emission) are posed.

SUMMARY OF THE INVENTION

The present invention has been made in consideration of the above situation and has as its object to provide a metal vapor laser apparatus which can prevent contamination of tube ends caused by adhesion of a metal vapor without enlarging the laser apparatus itself and can therefore oscillate a laser beam for a long time period with high efficiency.

The above object of the present invention is achieved by the following metal vapor laser apparatus. That is, the metal vapor laser apparatus comprises a discharge tube, a vacuum pump, a gas supply means, two electrodes arranged in the discharge tube, a power source means for applying a voltage to the electrodes, a metal vapor source arranged in the tube, and a pair of resonator mirrors. The interior of the discharge tube is kept airtight, and the end portion closer to the cathode electrode is longer along a tube axis than the end portion closer to the anode electrode. That is, since the transmission window at the cathode side is contaminated by a metal vapor or the like more easily than the transmission window at the anode side, a distance between the cathode electrode and the transmission window at cathode side is set longer than that between the anode electrode and the transmission window at anode side.

According to the present invention, the cathode side end portion of the discharge tube is made longer along the tube axis direction than the anode side end portion thereof without changing the overall length of the tube. Therefore, a metal vapor is prevented from being solidified and adhered on the cathode side transmission window which is more easily contaminated by the metal vapor. As a result, since light transmittivity of the transmission window is not much reduced as an operation time passes, a service life of the metal vapor laser apparatus can be prolonged.

BRIEF DESCRIPTION OF THE DRAWINGS

FIG. 2 is a longitudinal sectional view showing a metal vapor laser apparatus according to an embodiment of the present invention;

DETAILED DESCRIPTION OF THE PREFERRED EMBODIMENT

Figure 1:
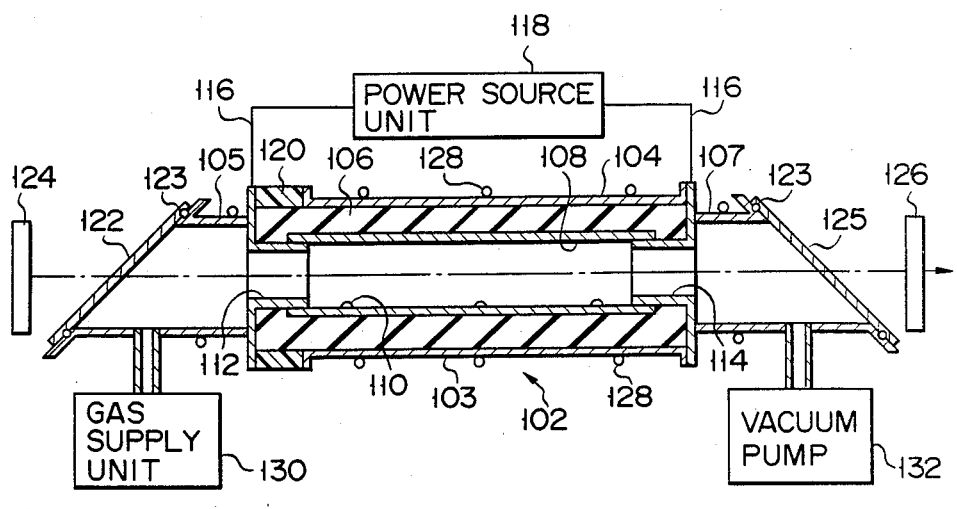
FIG. 1 is a longitudinal sectional view showing a conventional metal vapor laser apparatus.

An embodiment of the present invention will be described below with reference to FIG. 2.

FIG. 2 shows a copper vapor laser apparatus as an embodiment of a metal vapor laser apparatus. First, a structure of the laser apparatus will be described below.

Copper vapor laser apparatus 1 comprises cylindrical discharge tube 2. Tube 2 consists of central portion 5 and two end portions 7 and 9. Transmission windows 24 and 26 are formed in end portions 7 and 9 of tube 2, respectively, so that the interior of tube 2 is kept airtight. Central portion 5 of tube 2 has heat insulating member 4. Member 4 is made of zirconia fibers or alumina fibers. Cylindrical core tube 6 is located in an inner surface portion of member 4. Tube 6 is made of alumina ceramics. Airtight vessel 8 is located on an outer surface portion of member 4. Vessel 8 is made of copper. Substantially annular cathode and anode electrodes 10 and 12 are formed at both inside end portions of heat insulating member 4 and core tube 6. Electrodes 10 and 12 are connected to electric wires 14 extending from power source unit 16. Electrodes 10 and 12 oppose each other at the end portions of tube 6 and are exposed in discharge tube 2. In order to reliably insulate electrodes 10 and 12 from each other, annular high-voltage insulating member 18 is formed to be in contact with electrode 10 and airtight vessel 8. Member 18 is made of ceramics or plastics. Transmission windows 24 and 26 are located on an optical path through which a laser beam to be generated by electrical discharge between electrodes 10 and 12 passes. Windows 24 and 26 are airtightly mounted on discharge tube 2 by O-rings 28 so as to form a Brewster angle with respect to an optical axis of the laser beam. High reflecting mirror 30 and output mirror 32, made of, e.g., BK7 plate coated dielectric, for amplifying the laser beam are located on the optical path of the laser beam transmitted through windows 24 and 26. Mirrors 30 and 32 are arranged perpendicularly to the optical axis. Gas supply unit 38 for supplying a buffer gas such as He gas or Ne gas is arranged at portion 7 of tube 2. Assume that a length of portion 7 along the tube axis, i.e., a distance along the tube axis between an outmost end of electrode 10 and window 24 is $d_1$. Vacuum pump 40 is arranged at portion 9 to evacuate discharge tube 2. Assume that a length of portion 9 along the tube axis, i.e., a distance along the tube axis between an outmost end of electrode 12 and window 26 is $d_2$. Portions 7 and 9 are formed such that lengths $d_1$ and $d_2$ satisfy a relation $d_1 \geq 1.3 d_2$. More specifically, if portion 7 is formed such that $d_1$ becomes 200 mm, portion 9 is formed such that $d_2$ becomes 100 mm. Cooling pipe 42 for cooling is wound around the outer surface of tube 2. A plurality of grains of copper materials 44 as a laser medium are arranged inside tube 6.

Apparatus 1 having the above arrangement oscillates a laser beam as follows. First, pump 40 is activated to evacuate tube 2 to obtain a negative pressure therein. In this state, a buffer gas, e.g., Ne gas is supplied from gas supply unit 38. The buffer gas is filled in tube 2 to maintain 10 to 20 Torr therein. A pulse voltage is applied from power source unit 16 to cathode and anode electrodes 10 and 12 for electrical discharge and heating. Discharge is intermittently continued between electrodes 10 and 12 to heat discharge tube 6. Especially by heating tube 6, copper materials 44 are melted and evaporated as a copper vapor gas. The buffer gas is excited by discharge and collides against copper atoms so that energy of the gas is transferred to the copper atoms. The copper atoms are excited. As a result, the copper atoms transit between two energy levels to generate a laser beam. The laser beam is incident on high reflecting mirror 30 through transmission window 24. Since mirror 30 is arranged perpendicularly to the optical axis, the incident laser beam is reflected in the same optical axis direction. The reflected laser beam is transmitted through window 24 and propagates along an optical axis direction in core tube 6. The reflected laser beam is incident on output mirror 32 through transmission window 26. Although mirror 32 is semitransparent, a laser beam is reflected if the laser beam output is weaker than a threshold level. The laser beam reflected by mirror 32 propagates along the optical axis in tube 6 through window 26. The laser beam is amplified while it is reciprocated between mirrors 30 and 32. When the laser beam output is increased higher than a threshold level, a laser beam is emitted from mirror 32.

In apparatus 1, length $d_1$ of portion 7 is set longer than length $d_2$ of portion 9. In other words, the distance between window 24 at the cathode side and the outmost end of cathode electrode 10 is longer than that between window 26 at the anode side and the outmost end of anode electrode 12. For this reason, the positively charged metal vapor moves toward the cathode electrode and is adhered and solidified on a peripheral portion of cathode electrode 10 at a relatively low temperature. Window 24 is, however, separated away from electrode 10, and therefore a metal vapor is rarely adhered thereon. In addition, an amount of the metal vapor moving toward the anode electrode is relatively smaller than that at the cathode side. Therefore, although the distance between window 26 and the outmost end of electrode 12 is short, window 26 is not much contaminated by the metal vapor. For this reason, contamination of the transmission windows caused by a metal vapor can be prevented without increasing the overall length of tube 2. In this case, since a peripheral portion of O-ring 28 of window 26 which must be maintained at a comparatively low temperature is sufficiently separated from tube 2 as a high-temperature portion, sealing is not adversely affected.

Figure 3:
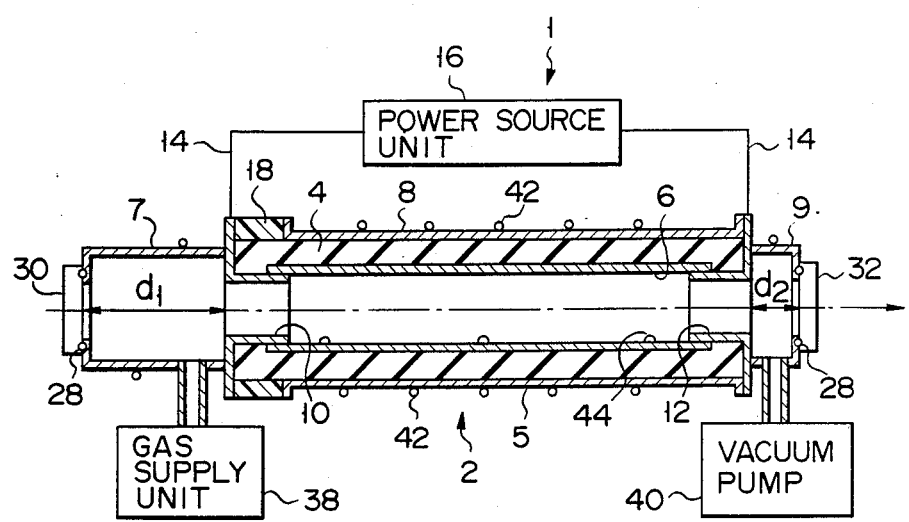
FIG. 3 is a longitudinal sectional view showing a metal vapor apparatus according to another embodiment of the present invention.

FIG. 3 shows a second embodiment according to the present invention. Metal vapor laser apparatus 1 shown in FIG. 3 is inner mirror type. Similar to the apparatus shown in FIG. 2, apparatus 1 comprises discharge tube 2. Tube 2 consists of central portion 5 and two end portions 7 and 9. High reflecting mirrors 30 and 32 are formed in end portions 7 and 9 of tube 2, respectively, so that the interior of tube 2 is kept airtight. Central portion 5 of tube 2 has heat insulating member 4. Cylindrical core tube 6 is located in an inner surface portion of member 4. A plurality of grains of copper materials 44 as a laser medium are located in a space defined by tube 6. Airtight vessel 8 is located on an outer surface portion of member 4. Substantially annular cathode and anode electrodes 10 and 12 are formed at both inside end portions of member 4 and tube 6. Electrodes 10 and 12 are connected to electric wires 14 extending from power source unit 16. Electrodes 10 and 12 are located at the end portions of tube 6 and are exposed in discharge tube 2. In order to reliably insulate electrodes 10 and 12 from each other, annular high-voltage insulating member 18 is formed to be in contact with electrode 10 and airtight vessel 8. High reflecting mirror 30 and output mirror 32 are airtightly mounted on the utbe 2 by O-rings 28 and arranged on an optical path of a laser beam to be generated by electrical discharge between electrodes 10 and 12. Mirrors 30 and 32 are arranged perpendicularly to the optical axis. Gas supply unit 38 for supplying a buffer gas is located at portion 7 of tube 2. Assume that a length of portion 7 along the tube axis, i.e., a distance along the tube axis between the outmost end of electrode 10 and mirror 30 is $d_1$. Vacuum pump 40 is located in portion 9 to evacuate discharge tube 2. Assume that a length of portion 9 along the tube axis, i.e., a distance along the tube axis between an outmost end of electrode 12 and mirror 32 is $d_2$. Portions 7 and 9 are formed such that lengths $d_1$ and $d_2$ satisfy a relation $d_1 \geq 1.3 d_2$. Cooling pipe 42 for cooling is wound around the outer surface of tube 2.

Similar to the first embodiment, the second embodiment having the above arrangement can oscillate a laser beam. Also in the second embodiment, since distance $d_1$ between mirror 30 and the outmost end of cathode electrode 10 is longer than distance $d_2$ between mirror 32 and the outmost end of anode electrode 12, the mirrors mounted on tube 2 are much less contaminated by the metal vapor. Therefore, a service life of the metal vapor laser apparatus can be prolonged without increasing the entire length of tube 2. In the second embodiment, since transmission windows are not arranged at the end portions of the tube, the entire length of the discharge tube can be shortened.

Figure 4:
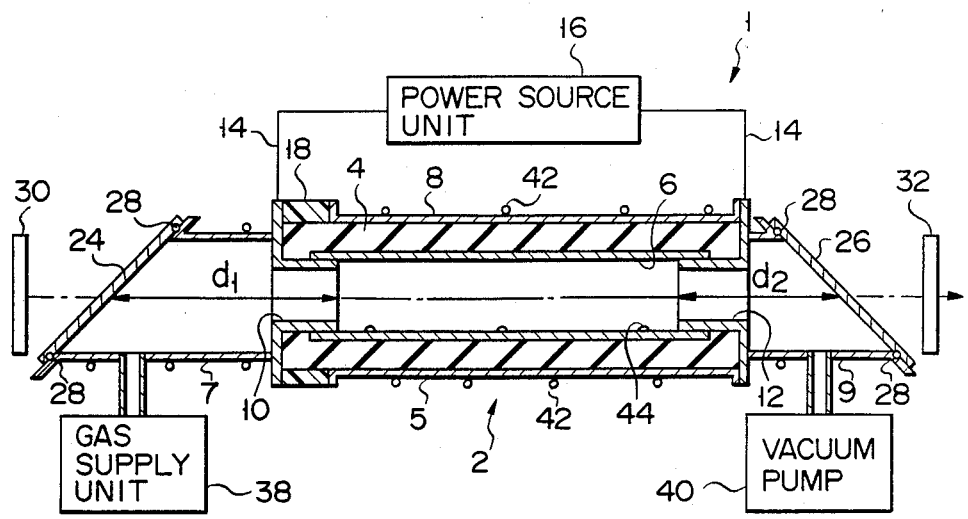
FIG. 4 is a longitudinal sectional view showing a metal vapor apparatus according to other embodiment of the present invention.

FIG. 4 shows a third embodiment according to the present invention. Metal vapor laser apparatus 1 is similar in structure and function to the apparatus of the first embodiment shown in FIG. 2. Only distance $d_1$ and $d_2$ are different between them. In this embodiment, $d_1$ denotes a distance along the tube axis between an inmost end of cathode electrode 10 and transmission window 24, and $d_2$ denotes a distance along the tube axis between an inmost end of anode electrode 12 and transmission window 26. End portions 7 and 9 are formed such that distances $d_1$ and $d_2$ satisfy a relation $d_1 \geq 1.3 d_2$.

Window 24 in the third embodiment is also separated away from electrode 10. Therefore, a metal vapor is rarely adhered thereon, due to which contamination of the transmission windows caused by a metal vapor can be prevented without increasing the overall length of tube 2.

The second embodiment shown in FIG. 3 can be modified in the similar way. In this case, $d_1$ denotes a distance along the tube axis between an inmost end of cathode electrode 10 and high reflecting mirror 30, and $d_2$ denotes a distance along the tube axis between an inmost end of anode electrode 12 and output mirror 32. End portions 7 and 9 are formed such that distances $d_1$ and $d_2$ satisfy a relation $d_1 \geq 1.3 d_2$. This modification can also prevent, without increasing the overall length of the tube, contamination of the mirrors caused by a metal vapor.

In the above embodiments, the copper vapor laser apparatus has been described as a metal vapor laser. The present invention is, however, not limited to the above embodiment but can be applied to a laser apparatus using another metal as a medium. In a laser apparatus using another metal, the values of $d_1$ and $d_2$ may be changed in consideration of a melting point of the metal.

As has been described above, according to the present invention, the distance along the tube axis between the cathode electrode and the end of the discharge tube is longer than that between the anode electrode and the other end of the tube. Therefore, the metal vapor is prevented from being solidified and adhered on the ends of the discharge tube. That is, the ends of the discharge tube are not contaminated over a long operation time. Therefore, aocording to the present invention, there is provided a metal vapor laser apparatus having a long service life in which the ends of the discharge tube are not contaminated.

What is claimed is:

1. A metal vapor laser apparatus comprising:
 a discharge tube for generating a laser beam, said tube containing a buffer gas under a predetermined pressure and having at least one set of a cathode electrode and an anode electrode, a distance between said cathode electrode and a cathode side end of said discharge tube along a tube axis direction being at least 1.3 times a distance between said anode electrode and an anode side end of said discharge tube;
 power source means for applying a voltage to said electrodes;
 a metal vapor source arranged in said discharge tube; and
 a pair of resonator mirrors for reflecting the laser beam generated in said discharge tube to cause optical resonation.

2. Apparatus according to claim 1 further comprising transmission windows arranged on said discharge tube to cross an optical axis of a laser beam at the Brewster angle with said transmission windows comprising the ends of said discharge tube.

3. Apparatus according to claim 1, wherein said resonator mirrors are arranged on said discharge tube so as to form the ends of said discharge tube.

4. Apparatus according to claim 1, wherein said metal vapor source is copper.

5. Apparatus according to claim 1, wherein said power source means generates a pulse voltage.

* * * * *